(12) United States Patent
Ahn

(10) Patent No.: US 10,430,523 B2
(45) Date of Patent: Oct. 1, 2019

(54) TERMINAL AND METHOD OF CONTROLLING THE SAME

(71) Applicant: Hyperconnect, Inc., Seoul (KR)

(72) Inventor: Sangil Ahn, Cheongju-si (KR)

(73) Assignee: Hyperconnect, Inc., Seoul (KR)

( * ) Notice: Subject to any disclaimer, the term of this patent is extended or adjusted under 35 U.S.C. 154(b) by 33 days.

(21) Appl. No.: 15/699,588

(22) Filed: Sep. 8, 2017

(65) Prior Publication Data
US 2018/0067929 A1    Mar. 8, 2018

(30) Foreign Application Priority Data
Sep. 8, 2016  (KR) .................. 10-2016-0115904

(51) Int. Cl.
| | | |
|---|---|---|
| *G10L 21/00* | (2013.01) | |
| *G06F 17/28* | (2006.01) | |
| *G10L 15/00* | (2013.01) | |
| *G10L 15/22* | (2006.01) | |
| *G10L 15/30* | (2013.01) | |
| *G10L 21/10* | (2013.01) | |
| *H04N 7/15* | (2006.01) | |
| *H04N 7/14* | (2006.01) | |

(52) U.S. Cl.
CPC .......... *G06F 17/289* (2013.01); *G10L 15/005* (2013.01); *G10L 15/22* (2013.01); *G10L 15/30* (2013.01); *G10L 21/10* (2013.01); *H04N 7/152* (2013.01); *H04N 7/147* (2013.01)

(58) Field of Classification Search
CPC ..... H04M 3/568; H04W 4/14; G06F 17/2223; G06F 17/289; G06F 3/018; G06F 17/28; G06F 17/2863; G06F 17/275; G06F 16/3337; G06F 3/0233

USPC ...................... 704/1–10, 230–257, 270–277
See application file for complete search history.

(56) References Cited

U.S. PATENT DOCUMENTS

| | | | |
|---|---|---|---|
| 9,953,630 B1* | 4/2018 | Aubrey ................. | G10L 15/005 |
| 2005/0114145 A1* | 5/2005 | Janakiraman ......... | G06F 17/289 |
| | | | 704/277 |
| 2010/0153396 A1* | 6/2010 | Margulies ............. | G06F 17/278 |
| | | | 707/737 |
| 2010/0283829 A1* | 11/2010 | De Beer ............... | G06F 17/289 |
| | | | 348/14.09 |
| 2012/0197629 A1* | 8/2012 | Nakamura ............ | G06F 17/289 |
| | | | 704/3 |

(Continued)

FOREIGN PATENT DOCUMENTS

| | | |
|---|---|---|
| JP | 2014-150442 A | 8/2014 |
| KR | 10-2014-0105673 A | 9/2014 |

(Continued)

OTHER PUBLICATIONS

Office Action dated Jul. 26, 2017 of corresponding Korean Patent Application No. 10-2016-0115904—6 pages.

*Primary Examiner* — Huyen X Vo
(74) *Attorney, Agent, or Firm* — Knobbe Martens Olson & Bear LLP

(57) ABSTRACT

A terminal control method may include: establishing, by a first terminal used by a first user who speaks a first language, connection to a second terminal used by a second user who speaks a second language different from the first language; and acquiring a second-language greeting transliterated into the first language.

14 Claims, 13 Drawing Sheets

(56) References Cited

U.S. PATENT DOCUMENTS

| | | | |
|---|---|---|---|
| 2014/0273999 A1* | 9/2014 | Mottes | H04W 4/14 |
| | | | 455/414.4 |
| 2014/0337007 A1 | 11/2014 | Waibel et al. | |
| 2015/0350451 A1* | 12/2015 | Aue | H04M 3/568 |
| | | | 379/202.01 |
| 2016/0170970 A1* | 6/2016 | Lindblom | G06F 17/28 |
| | | | 704/3 |

FOREIGN PATENT DOCUMENTS

| | | |
|---|---|---|
| KR | 10-2015-0105075 A | 9/2015 |
| KR | 10-2016-0105215 A | 9/2016 |

* cited by examiner

FIG. 8

|    | EN | KO | JP | ES | DE | FR |
|----|----|----|----|----|----|----|
| EN | Hi. Nice to meet you. | an-nyeong-ha-se-yo. ban-gab-seub-ni-da. | Hajimemashite. Kon'nichiwa. | oh-lah. moo-choh goos-toh ehn kono-sairtay. | Hey. Froyt mikh dikh kay-nen-tsu-lair-nen. | Saloo. On-shawn-tay day voo rencontray. |
| KO | 하이. 나이스 투 미츄. | 안녕하세요. 반갑습니다. | 하지메마시떼. 콘니찌와. | 올라. 무쵸 구스또 엥 꼬노쎄르떼. | 헤이. 프로이트 미치 다히 켄넨쭈래 아넨. | 쌀뤼. 엉샹떼 드 부 헝꽁트헤. |
| JP | ハイ。ナイス トゥ ミー チュー。 | アンニョンハセ ヨ。パンガプス ムニダ。 | 初めまして。こんにちは。 | オラ。ムチョグ スト エン コノセ ルテ。 | ヘイ。フロイト ミッヒ ジーケネ ン ツー レルネ ン。 | サリュ。アン シャンテ ドゥ ヴ ランコントレ。 |
| ES | Jai. Nais tu mit yu. | an-niong-ja-se-yo. ban-gab-sub-mi-da. | Jayimemashite. Kon'nichiwa. | Hola. Mucho gusto en conocerte. | Jai. Froeit mij dij kenenzuleanen. | Salu. Anshante de vu joncontre. |
| DE | Hai. Nais tu miet yu. | an-nyeong-ha-se-yo. ban-gab-sib-ni-da. | Hadschimemas chite. Kon'nitschiwa. | Hola. Mutscho gusto en konoserte. | Hey. Freut mich dich kennenzulernen. | Salü. Oschonte de wu rocontre. |
| FR | Aie. Naice tou mit you. | an-niong-ja-se-yo. ban-gab-sub-mi-da. | Jayimemaste. Konichiwa. | Hola. Mucho gusto en conocerte. | Hey. Freuit mi diche kennenzulianen. | Salut. Enchanté de vous rencontrer. |

TERMINAL AND METHOD OF CONTROLLING THE SAME

CROSS-REFERENCE TO RELATED APPLICATION

This application claims the benefit of Korean Patent Application No. 10-2016-0115904, filed on Sep. 8, 2016, in the Korean Intellectual Property Office, the disclosure of which is incorporated herein in its entirety by reference.

BACKGROUND

1. Field

One or more embodiments relate to a terminal, which helps users who speak different languages in making video calls with each other, and a method of controlling the same.

2. Description of the Related Art

With the developments of communication technologies and the miniaturization of electronic devices, personal terminals have become widely spread to general customers. In particular, personal portable terminals, such as smart phones or smart tablets, have recently been widely used. Most terminals include a communication function. A user may search on the Internet using a terminal or may exchange messages with another user.

Also, with the developments of small-sized camera technologies, small-sized microphone technologies, small-sized display technologies, and small-sized speaker technologies, most terminals such as smart phones include a camera, a microphone, a display, and a speaker. A user may use the terminal to record a voice or capture a video including a voice. The user may confirm the recorded voice through the speaker included in the terminal or the captured video through the display included in the terminal.

Also, the user may share the recorded voice or the captured video with another user using the communication function of the terminal. The user may send a previously recorded voice or a previously captured video to another user. Also, the user may send a voice or a video, which is being currently recorded or captured by the terminal, to another user in real time. Also, at the same time, another user may send a voice or a video, which is being currently recorded or captured by his or her own terminal, to the user in real time. The display included in the terminal of the user may simultaneously display the video that is being currently captured by the terminal of the user and the video that is being currently captured by the terminal of another user. Also, the speaker included in the terminal of the user may simultaneously reproduce the voice that is being currently recorded by the terminal of another user. In other words, the user and another user may make video calls with each other using their own terminals.

The user and another user may or may not be acquainted with each other. A plurality of terminals, including the terminal of the user and the terminal of another user, may be connected to a server. The server may mediate between the terminal of the user and the terminal of another user. Therefore, even though the user and another user are not acquainted with each other, the user and another user may make video calls with each other through the mediation of the server.

A language the user speaks may be different from a language another user speaks. If the users making the video call speak different languages, an awkward atmosphere may be created between them, and the conversation between them may be cut off.

SUMMARY

Some example embodiments may provide a terminal, which help users who speak different languages in making video calls with each other, and a method of controlling the same.

Some example embodiments may provide a terminal, which is capable of reducing awkwardness between users who speak different languages when making video calls with each other, and a method of controlling the same.

Some example embodiments may provide a terminal, which is capable of inducing conversation between users who speak different languages when making video calls with each other, and a method of controlling the same.

Additional aspects will be set forth in part in the description which follows and, in part, will be apparent from the description, or may be learned by practice of the presented embodiments.

In some example embodiments, a terminal control method may comprise: establishing, by a first terminal used by a first user who speaks a first language, connection to a second terminal used by a second user who speaks a second language different from the first language; and acquiring a second-language greeting transliterated into the first language.

In some example embodiments, the acquiring of the second-language greeting may comprise: identifying a kind of the first language; identifying a kind of the second language; and acquiring the second-language greeting transliterated into the first language when the identified kind of the first language is different from the identified kind of the second language.

In some example embodiments, the identifying of the kind of the first language may include identifying the kind of the first language using a voice of the first user recorded by the first terminal.

In some example embodiments, the identifying of the kind of the first language may include identifying the kind of the first language using language setting set to the first terminal.

In some example embodiments, the identifying of the kind of the first language may comprise: acquiring information about a region in which the first terminal is located; and identifying a kind of a language corresponding to the region in which the first terminal is located.

In some example embodiments, the identifying of the kind of the first language may comprise: transmitting, to a server, a voice of the first user recorded by the first terminal, language setting set to the first terminal, or information about a region in which the first terminal is located; and receiving identification information about the kind of the first language from the server as a response to the transmission.

In some example embodiments, the identifying of the kind of the first language may comprise: transmitting, to the second terminal, a voice of the first user recorded by the first terminal, language setting set to the first terminal, or information about a region in which the first terminal is located; and receiving identification information about the kind of the first language from the second terminal as a response to the transmission.

In some example embodiments, the identifying of the kind of the second language may comprise: receiving a voice of the second user recorded by the second terminal; and identifying the kind of the second language using the received voice of the second user.

In some example embodiments, the identifying of the kind of the second language may comprise: receiving information about language setting set to the second terminal; and identifying the kind of the second language using the received information.

In some example embodiments, the identifying of the kind of the second language may comprise: receiving information about a region in which the second terminal is located; and identifying a kind of a language corresponding to the region in which the second terminal is located.

In some example embodiments, the identifying of the kind of the second language may include receiving identification information about the kind of the second language from the server or the second terminal.

In some example embodiments, the acquiring of the second-language greeting transliterated into the first language when the identified kind of the first language is different from the identified kind of the second language may comprise: retrieving identification information about the kind of the first language and identification information about the kind of the second language from a database; and when greetings corresponding to the kind of the first language and the kind of the second language are present in the database, acquiring the greetings from the database as a result of the retrieving.

In some example embodiments, the acquiring of the second-language greeting transliterated into the first language when the identified kind of the first language is different from the identified kind of the second language may comprise: retrieving identification information about the kind of the first language and identification information about the kind of the second language from a database; transmitting the identification information about the first language and the identification information about the second language to the server when greetings corresponding to the kind of the first language and the kind of the second language are not present in the database; receiving the greetings corresponding to the kind of the first language and the kind of the second language from the server as a response to the transmission; and caching the identification information about the kind of the first language, the identification information about the kind of the second language, and the received greetings in the database.

In some example embodiments, the acquiring of the second-language greeting transliterated into the first language when the identified kind of the first language is different from the identified kind of the second language may comprise: transmitting identification information about the kind of the first language and identification information about the kind of the second language to a server; and receiving the greetings corresponding to the kind of the first language and the kind of the second language from the server as a response to the transmission.

In some example embodiments, the acquiring of the greeting may comprise: transmitting, to a server, a voice of the first user recorded by the first terminal, language setting set to the first terminal, or information about a region in which the first terminal is located; and receiving the second-language greeting transliterated into the first language from the server as a response to the transmission.

In some example embodiments, the acquiring of the greeting may comprise: transmitting, to the second terminal, a voice of the first user recorded by the first terminal, language setting set to the first terminal, or information about a region in which the first terminal is located; and receiving the second-language greeting transliterated into the first language from the second terminal as a response to the transmission.

In some example embodiments, the establishing of, by the first terminal, the connection to the second terminal may comprise: establishing, by the first terminal, a video call session with the second terminal; transmitting, to the second terminal, a stream including an image of the first user captured by the first terminal and a voice of the first terminal recorded by the first terminal; and receiving, from the second terminal, a stream including an image of the second user captured by the second terminal and a voice of the second terminal recorded by the second terminal.

In some example embodiments, a terminal control method may comprise: establishing, by a server, connection between a first terminal and a second terminal; receiving a first voice recorded by the first terminal, first language setting set to the first terminal, or first information about a region in which the first terminal is located; identifying a kind of a first language corresponding to the first terminal using the first voice, the first language setting, or the first information; receiving a second voice recorded by the second terminal, second language setting set to the second terminal, or second information about a region in which the second terminal is located; identifying a kind of a second language corresponding to the second terminal using the second voice, the second language setting, or the second information; and transmitting a second-language greeting transliterated into the first language to the first terminal when the identified kind of the first language is different from the identified kind of the second language.

In some example embodiments, a terminal, which is used by a user who speaks a first language, may comprise: a communication interface configured to establish connection to another terminal used by another user who speaks a second language different from the first language; a controller configured to acquire a second-language greeting transliterated into the first language; and an output interface configured to display the acquired second-language greeting.

BRIEF DESCRIPTION OF THE DRAWINGS

These and/or other aspects will become apparent and more readily appreciated from the following description of embodiments, taken in conjunction with the accompanying drawings in which:

FIG. 8 is a table showing second-language greetings transliterated into first languages, according to an embodiment;

DETAILED DESCRIPTION

Advantages and features and a method of achieving the same will be more clearly understood from embodiments described below in detail with reference to the accompanying drawings. However, the present disclosure is not limited to the following embodiments and may be implemented in various different forms. The embodiments are provided merely to complete disclosure and to provide those of ordinary skill in the art with the category of the present disclosure. The present disclosure is defined only by the claims. Wherever possible, the same reference numbers will be used throughout the specification to refer to the same or like components.

Also, it will be understood that although the terms "first", "second", etc. may be used herein to describe various components, these components should not be limited by these terms. These terms are only used to distinguish one component from another. Therefore, a first component used herein may be a second component within the technical scope of the present disclosure.

The terminology used herein is for the purpose of describing particular embodiments only and is not intended to limit the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated components and/or steps, but do not preclude the presence or addition of one or more other components and/or steps.

Unless otherwise defined, all terms used herein have the same meaning as commonly understood by those of ordinary skill in the art. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Hereinafter, terminals 100 and 150 and methods of controlling the same, according to embodiments, will be described in detail with reference to FIGS. 1 to 13.

Figure 1:
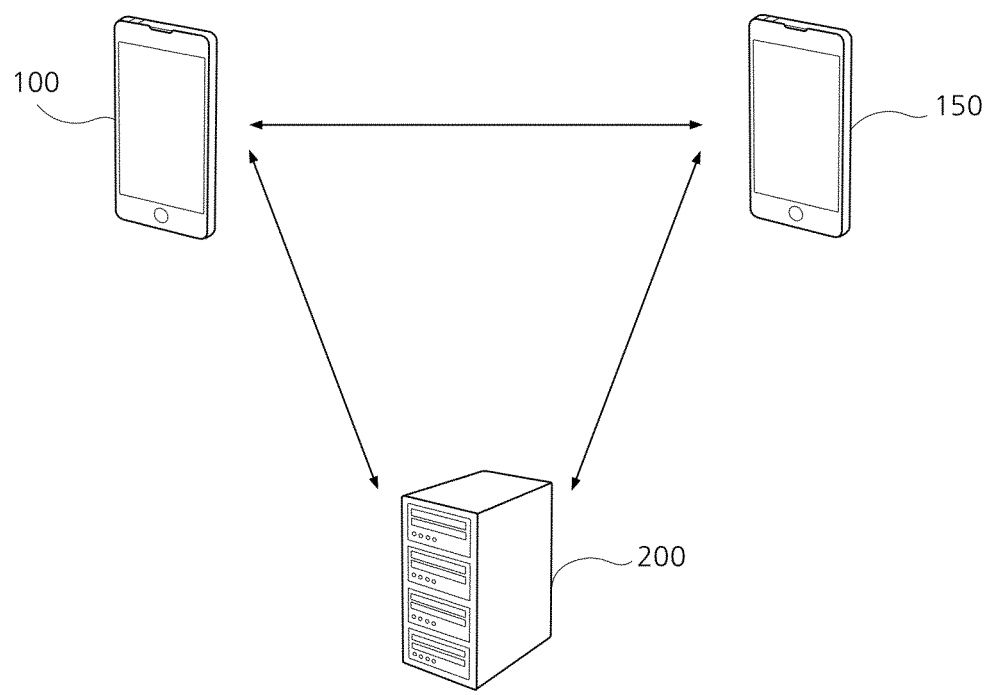
FIG. 1 is a network configuration diagram illustrating an environment in which a terminal according to an embodiment operates.

FIG. 1 is a network configuration diagram illustrating an environment in which terminals 100 and 150 according to an embodiment operate. Referring to FIG. 1, the environment in which the terminals 100 and 150 operate may include a first terminal 100, and a second terminal 150 connected to the first terminal 100.

According to another embodiment, the environment in which the terminals 100 and 150 operate may further include a server 200 connected to the first terminal 100 or the second terminal 150. The environment in which the terminals 100 and 150 operate may not include the server 200.

The first terminal 100 may be, for example, a desktop computer, a laptop computer, a smart phone, a smart tablet, a smart watch, a mobile terminal, a digital camera, a wearable device, or a portable electronic device. The first terminal 100 may execute programs or applications.

The first terminal 100 may be connected to a communication network. The first terminal 100 may be connected to an external device via the communication network. The first terminal 100 may transmit data to the connected external device or receive data from the connected external device.

The communication network connected to the first terminal 100 may include a wired communication network, a wireless communication network, or a composite communication network. The communication network may include a mobile communication network such as 3G, Long Term Evolution (LTE), or LTE-A. The communication network may include a wired or wireless communication network such as Wi-Fi, Universal Mobile Telephone System/General Packet Radio Service (UMTS/GPRS), or Ethernet. The communication network may include a short-range communication network such as Magnetic Secure Transmission (MST), Radio Frequency Identification (RFID), Near Field Communication (NFC), ZigBee, Z-Wave, Bluetooth, Bluetooth Low Energy (BLE), or InfraRed (IR) communication. The communication network may include Local Area Network (LAN), Metropolitan Area Network (MAN), or Wide Area Network (WAN).

Figure 2:
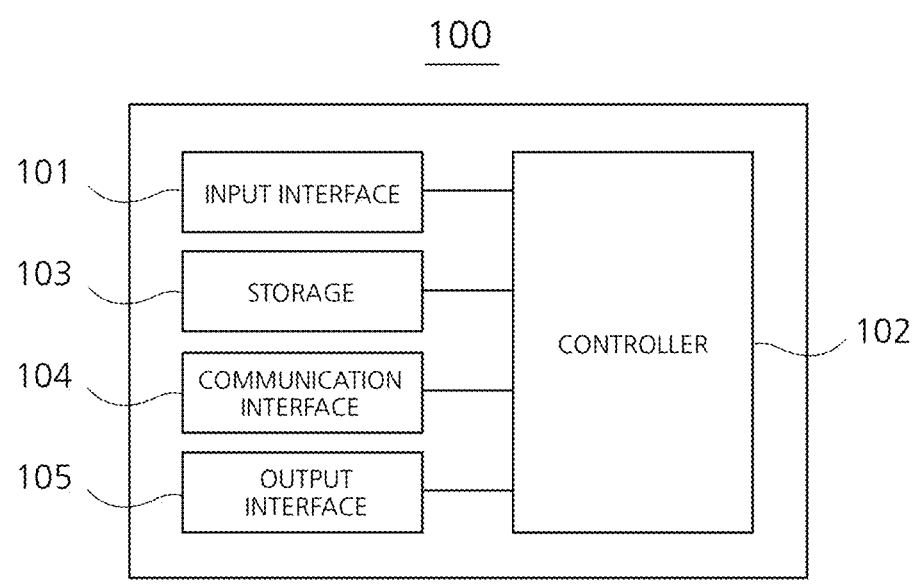
FIG. 2 is a block diagram illustrating a configuration of a terminal according to an embodiment.

FIG. 2 is a block diagram illustrating the configurations of the terminals 100 and 150 according to an embodiment. Referring to FIG. 2, each of the terminals 100 and 150 according to an embodiment may include an input interface 101, a controller 102, a storage 103, a communication interface 104, and an output interface 105.

The input interface 101 may receive an external signal. The input interface 101 may receive signals from users of the terminals 100 and 150. Also, the input interface 101 may receive a signal from an external device. The input interface 101 may include, for example, a microphone, a camera, a keyboard, a mouse, a track ball, a touch screen, a button, a switch, a sensor, a network interface, or other input devices.

The input interface 101 may receive light from the exterior through the camera included in the input interface 101. The input interface 101 may receive light emitted from an external object or light reflected from an external object. The input interface 101 may capture images of the users of the terminals 100 and 150 through the camera.

The input interface 101 may receive a voice from the exterior through the microphone included in the input interface 101. The input interface 101 may receive voices from the users of the terminals 100 and 150. Also, the input interface 101 may receive voices from an external voice reproduction device. The input interface 101 may record voices of the users of the terminals 100 and 150 through the microphone.

The controller 102 may control operations of the terminals 100 and 150. The controller 102 may be connected to the components included in the terminals 100 and 150. The controller 102 may control operations of the components included in the terminals 100 and 150. The controller 102 may control the operations of the terminals 100 and 150 in response to a signal received by the input interface 101.

Also, the controller 102 may process a signal. The controller 102 may process a signal received by the input interface 101. For example, the controller 102 may process the images of the users of the terminals 100 and 150 captured by the camera included in the input interface 101. The controller 102 may process the voices of the users of the terminals 100 and 150 recorded by the microphone included in the input interface 101.

Also, the controller 102 may perform an arithmetic operation. The controller 102 may perform an arithmetic operation according to a signal received by the input interface 101. The controller 102 may perform an arithmetic operation using a signal received by the input interface 101 or data stored in the storage 103. For example, the controller 102 may encode an image captured by the camera included in the input interface 101. The input interface 102 may encode a voice recorded by the microphone included in the input interface 101. The controller 102 may perform control such that the result of the arithmetic operation is stored in the storage 103. The controller 102 may perform control such that the result of the arithmetic operation is output by the output interface 105.

The controller 102 may include, for example, a central processing unit (CPU), a graphic processing unit (GPU), a micro controller unit (MCU), or a microprocessor.

The storage 103 may store data. The storage 104 may store data to be used when the controller 102 performs the arithmetic operation. The storage 103 may store the result of the arithmetic operation performed by the controller 102. For example, the storage 103 may store an image or a voice encoded by the controller 102. The storage 103 may store data to be transmitted to the exterior through the communication interface 104, or may store data received from the exterior through the communication interface 104.

The storage 103 may be a volatile memory or a nonvolatile memory. The storage 103 may include, for example, flash memory, read-only memory (ROM), random access memory (RAM), electrically erasable read-only memory (EEROM), erasable programmable read-only memory (EPROM), electrically erasable and programmable read-only memory (EEPROM), hard disk drive (HDD), register, or the like. The storage 103 may include, for example, a file system, a database, or an embedded database.

The communication interface 104 may transmit data to the exterior or receive data from the exterior. The communication interface 104 may transmit data to another terminal 100 or 150 or the server 200. The communication interface 104 may receive data from another terminal 100 or 150 or the server 200. The communication interface 104 may transmit the result of the arithmetic operation performed by the controller 102 to the exterior. Also, the communication interface 104 may transmit data stored in the storage 103 to the exterior. The communication interface 104 may receive external data to be used when the controller 102 performs the arithmetic operation.

Data to be transmitted by the communication interface 104 or data received by the communication interface 104 may be stored in the storage 103. For example, the communication interface 104 may transmit an encoded image or voice stored in the storage 103 to the server 200 or another terminal 100 or 150. Also, the communication interface 104 may receive an image or a voice encoded by another terminal 100 or 150 from another terminal 100 or 150.

The communication interface 104 may include a long-range network interface such as a 3G module, an LTE module, an LTE-A module, a Wi-Fi module, a WiGig module, an Ultra Wide Band (UWB) module, or a LAN card. Also, the communication interface 104 may include a short-range network interface such as an MST module, a Bluetooth module, an NFC module, an RFID module, a ZigBee module, a Z-Wave module, or an IR module. In addition, the communication interface 104 may include other network interfaces.

The output interface 105 may output a signal to the exterior. The output interface 105 may, for example, display a screen, reproduce a sound, or output a vibration. The output interface 105 may include a display, a speaker, a vibrator, an oscillator, or other output devices.

The output interface 105 may display a screen. The controller 102 may control the output interface 105 to display a screen. The output interface 105 may display a user interface. The output interface 105 may display another screen in response to a user input.

The output interface 105 may display data. The output interface 105 may display the result of the arithmetic operation performed by the controller 102. The output interface 105 may display data stored in the storage 103. The output interface 105 may display data received by the communication interface 104.

The output interface 105 may include a flat-panel display device such as a liquid crystal display (LCD), an organic light-emitting diode (OLED), or a plasma display panel (PDP). The output interface 105 may include a curved display or a flexible display. The output interface 105 may include a touch screen.

The output interface 105 may display the image of the user of the first terminal 100 captured by the first terminal 100 or the image of the user of the second terminal 150 captured by the second terminal 150. Also, the output interface 105 may reproduce the voice of the user of the first terminal 100 recorded by the first terminal 100 or the voice of the user of the second terminal 150 recorded by the second terminal 150.

A type of the second terminal 150 may be identical to or different from a type of the first terminal 100. The second terminal 150 may execute programs or applications.

The second terminal 150 may be connected to a communication network. The second terminal 150 may be connected to an external device via the communication network. The second terminal 150 may transmit data to the connected external device or receive data from the connected external device.

The second terminal 150 may be connected to the first terminal 100. The second terminal 150 may be connected to the first terminal 100 via the communication network. The second terminal 150 may transmit data to the first terminal 100 or receive data from the first terminal 100.

The first terminal 100 and the second terminal 150, which are connected to each other, may exchange messages, files, voice data, images, or videos with each other. The first terminal 100 may establish a voice call session or a video call session with the second terminal 150. The user of the first terminal 100 and the user of the second terminal 150 may make voice calls or video calls with each other.

The first terminal 100 and the second terminal 150 may directly exchange data with each other. Also, the first terminal 100 and the second terminal 150 may exchange data with each other via the server 200 or another mediating device.

A language the user of the first terminal 100 speaks may be identical to or different from a language the user of the second terminal 150 speaks. The language the first terminal 100 speaks may be a first language. The language the second terminal 150 speaks may be a second language. The first language and the second language may be identical to or different from each other. The first language or the second language may be, for example, Korean, English, Japanese, Chinese, German, French, Spanish, Italian, Turkish, Arabic, Thai, or Vietnamese.

The server 200 may be connected to the first terminal 100 or the second terminal 150. When the server 200 is connected to the first terminal 100, the server 200 may exchange data with the first terminal 100 via the communication network. When the server 200 is connected to the second terminal 150, the server 200 may exchange data with the second terminal 150 via the communication network.

The server 200 may receive data from the first terminals 100. The server 200 may perform an arithmetic operation using the data received from the first terminal 100. The server 200 may transmit the result of the arithmetic operation to the first terminal 100 or the second terminal 150. The server 200 may receive data from the second terminals 150. The server 200 may perform an arithmetic operation using the data received from the second terminal 150. The server 200 may transmit the result of the arithmetic operation to the first terminal 100 or the second terminal 150.

Hereinafter, specific operations of the terminals 100 and 150 in the terminal control method, according to an embodiment, will be described in detail with reference to FIGS. 3 to 13.

Figure 3:
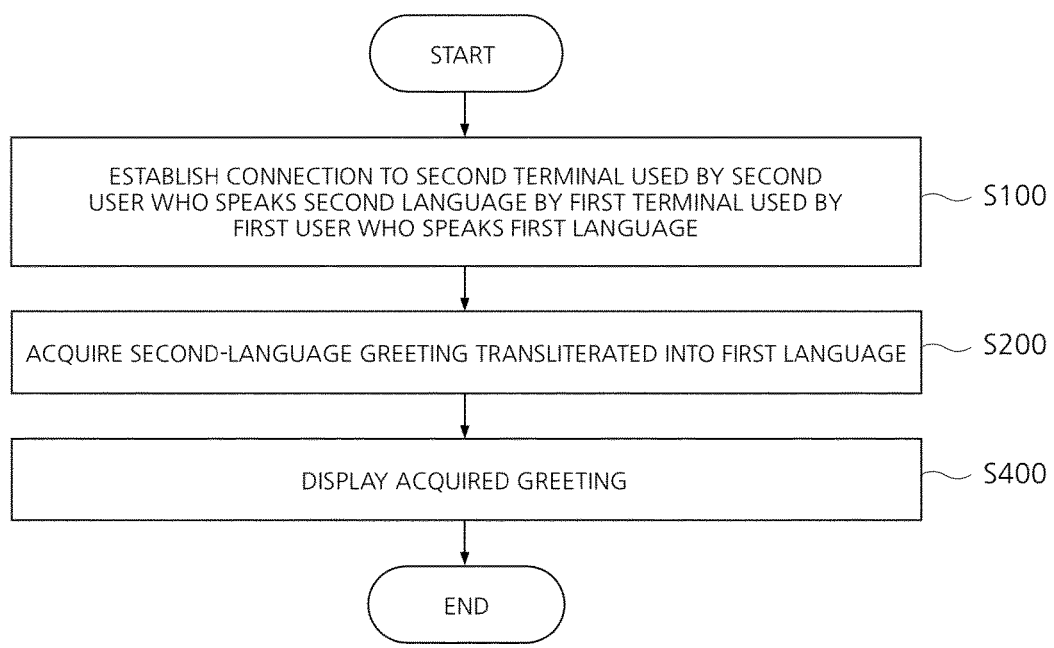
FIG. 3 is a flowchart of a terminal control method according to an embodiment.

FIG. 3 is a flowchart of a terminal control method according to an embodiment. Referring to FIG. 3, in operation S100, the first terminal 100 of the first user who speaks a first language may establish connection to the second terminal 150 of the second user who speaks a second language different from the first language.

The first user may use the first terminal 100. The first user may speak the first language. The first language may be, for example, Korean, English, Japanese, Chinese, German, French, Spanish, Italian, Turkish, Arabic, Thai, or Vietnamese. Hereinafter, it is assumed that the first language is English.

The second user may use the second terminal 150. The second user may speak the second language. The second language may be, for example, Korean, English, Japanese, Chinese, German, French, Spanish, Italian, Turkish, Arabic, Thai, or Vietnamese. Hereinafter, it is assumed that the second language is Korean.

Figure 4:
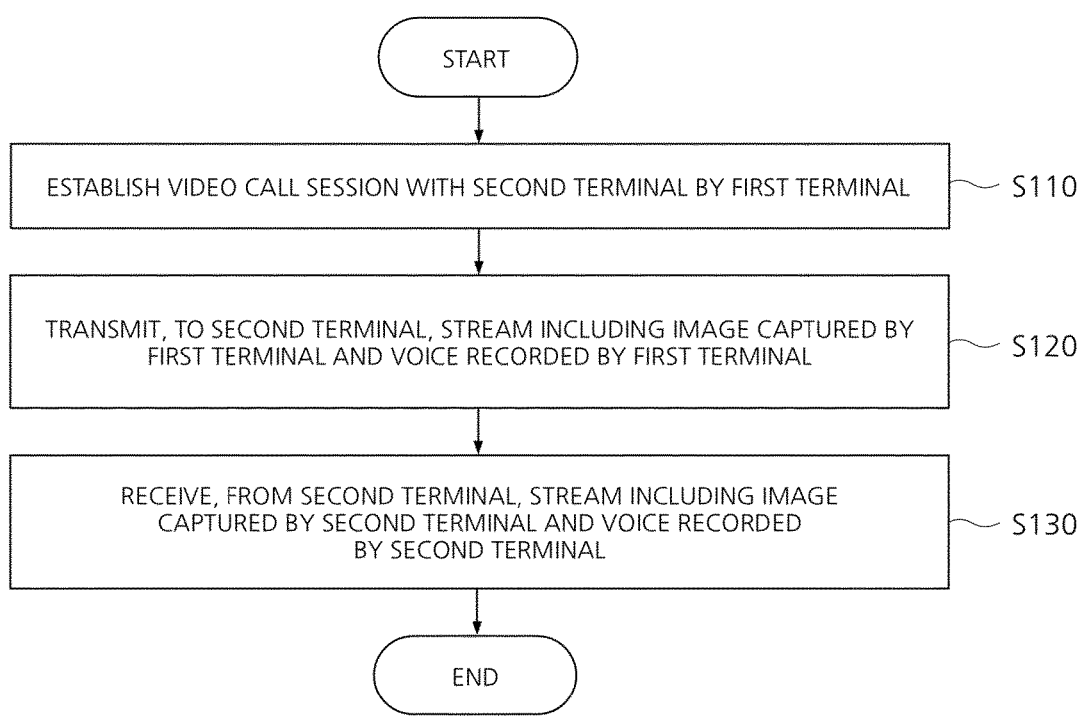
FIG. 4 is a flowchart of a process of establishing connection to a second terminal by a first terminal, according to an embodiment.

The first terminal 100 may establish connection to the second terminal 150. FIG. 4 is a flowchart of operation S100 of establishing the connection to the second terminal 150 by the first terminal 100, according to an embodiment.

Referring to FIG. 4, in operation S110, the first terminal 100 may establish a video call session with the second terminal 150. The communication interface 104 of the first terminal 100 and the communication interface 104 of the second terminal may establish the video call session.

The video call session may be directly established between the first terminal 100 and the second terminal 150. According to another embodiment, the video call session may be established between the first terminal 100 and the second terminal 150 via at least one device. For example, the video call session may include a session established between the first terminal 100 and the server 200 and a session established between the server 200 and the second terminal 150.

In operation S120, a stream including an image of the first user captured by the first terminal 100 and a voice of the first user recorded by the first terminal 100 may be transmitted to the second terminal 150. The camera included in the input interface 101 of the first terminal 100 may capture the image of the first user. Also, the microphone included in the input interface 101 of the first terminal 100 may record the voice of the first user.

The communication interface 104 of the first terminal 100 may transmit the stream including the captured image and the recorded voice to the second terminal 150. The communication interface 104 of the first terminal 100 may transmit the stream to the second terminal 150 through the video call session. The communication interface 104 of the second terminal 150 may receive the stream from the first terminal 100.

In operation S130, a stream including an image of the second user captured by the second terminal 150 and a voice of the second user recorded by the second terminal 150 may be received from the second terminal 150. The camera included in the input interface 101 of the second terminal 150 may capture the image of the second user. Also, the microphone included in the input interface 150 of the second terminal 150 may record the voice of the second user.

The communication interface 104 of the second terminal 150 may transmit the stream including the captured image and the recorded voice to the first terminal 100. The communication interface 104 of the second terminal 150 may transmit the stream to the first terminal 100 through the video call session. The communication interface 104 of the first terminal 100 may receive the stream from the second terminal 150.

Referring to FIG. 3 again, in operation S200, a second-language greeting transliterated into the first language may be acquired. The first terminal 100 may acquire a second-language greeting transliterated into the first language.

The second-language greeting may be, for example, "안녕하세요. 반갑습니다." The result of transliterating the second-language greeting into the first language may include a pronunciation of the second-language greeting expressed by the first language. In other words, when the second-language greeting is transliterated into the first language, the pronunciation of the second-language greeting may be expressed by the first language as it sounds. The result of the transliteration into the first language may be, for example, "an-nyeong-ha-se-yo. ban-gab-seub-ni-da."

Figure 5:
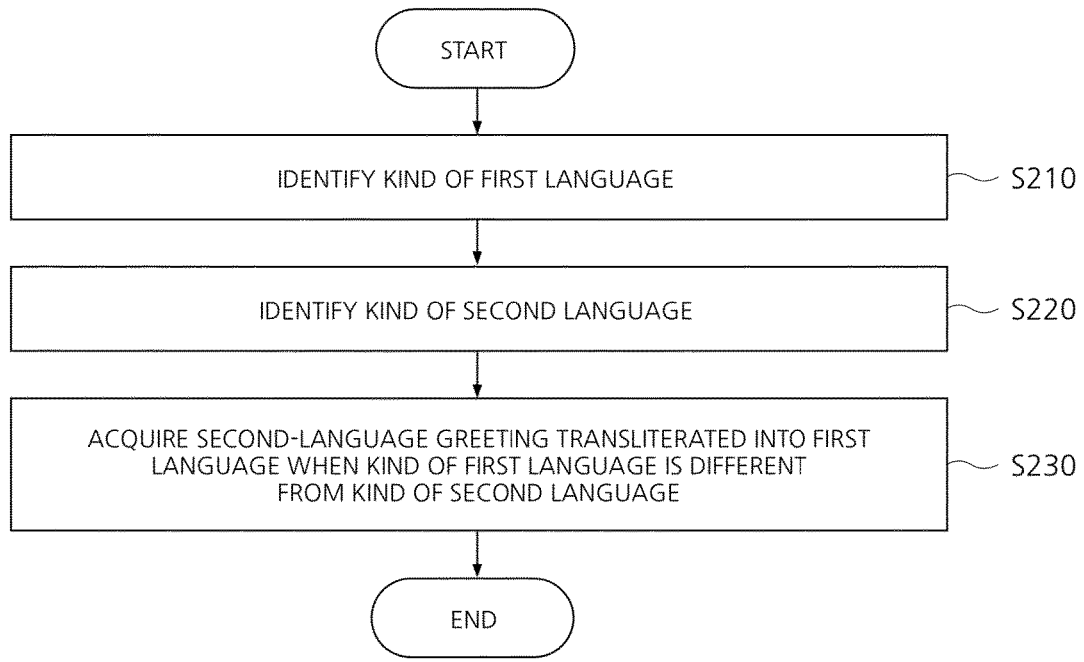
FIG. 5 is a flowchart of a process of acquiring a greeting by a first terminal, according to an embodiment.

FIG. 5 is a flowchart of operation S200 of acquiring the greeting by the first terminal 100, according to an embodiment. Referring to FIG. 5, in operation S210, the kind of the first language may be identified.

The first terminal 100 may identify the kind of the first language. The controller 102 of the first terminal 100 may identify the kind of the first language using the voice of the first user recorded by the input interface 101 of the first terminal 100. The controller 102 may perform voice recognition using the recorded voice. The controller 102 may detect the kind of the first language as a result of the voice recognition.

For example, the controller 102 may extract at least one feature from the recorded voice. The controller 102 may calculate a probability distribution of the kind of the language corresponding to the extracted feature using machine learning. For example, the controller 102 may calculate the probability distribution using Bayesian multinomial logistic regression. The controller 102 may select the kind of the language corresponding to the highest probability in the calculated probability distribution.

According to another embodiment, the controller 102 may identify the kind of the first language using language setting set to the first terminal 100. Information about the kind of the language preferred by the first user may be preset to the first terminal 100. The information may be stored in the storage 103 of the first terminal 100. The controller 102 may define the kind of the language corresponding to the information as the kind of the first language.

According to another embodiment, the controller 102 may identify the kind of the first language using information about a region in which the first terminal 100 is located. The controller 102 may acquire the information about the region in which the first terminal 100 is located through Global Positioning System (GPS) included in the input interface 101 of the first terminal 100.

The controller 102 may acquire the kind of the language corresponding to the region in which the first terminal 100 is located using the acquired information. For example, the controller 102 may a name of the region in which the first terminal 100 is located using a latitude and a longitude at which the first terminal 100 is located.

The storage 103 of the first terminal 100, an external database, the server 200 may store information about the kind of the language corresponding to a name of each region. For example, "Seoul" may correspond to Korean, and "New York" may correspond to English. The controller 102 may acquire the kind of the language corresponding to the acquired name of the region using the storage 103, the external database, or the server 200.

Figure 6:
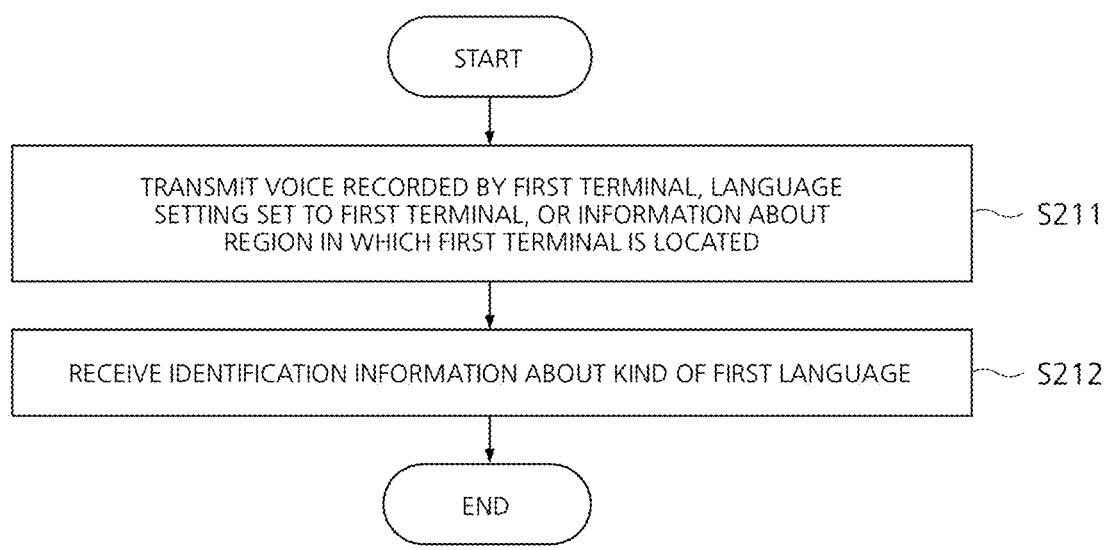
FIG. 6 is a flowchart of a process of identifying a kind of a first language by a first terminal, according to an embodiment.

According to another embodiment, the controller 102 may identify the kind of the first language through the server 200 or the second terminal 150. FIG. 6 is a flowchart of a process of identifying the kind of the first language through the server 200 or the second terminal 150 by the first terminal 100, according to an embodiment.

Referring to FIG. 6, in operation S211, the voice of the first user recorded by the first terminal 100, the language setting set to the first terminal 100, or the information about the region in which the first terminal 100 is located may be transmitted to the server 200 or the second terminal 150. The communication interface 104 of the first terminal 100 may transmit the recorded voice, the language setting, or the information about the region to the server 200 or the second terminal 150.

In operation S212, identification information about the kind of the first language may be received from the server 200 or the second terminal 150 as a response to the transmission. The server 200 or the second terminal 150 may identify the kind of the first language using the recorded voice, the language setting, or the information about the region, which is received from the first terminal 100. The server 200 or the second terminal 150 may transmit the identification information about the kind of the first language to the first terminal 100. The communication interface 104 of the first terminal 100 may receive the identification information about the kind of the first language from the server 200 or the second terminal 150.

Referring to FIG. 5 again, in operation S220, the kind of the second language may be identified. The first terminal 100 may identify the kind of the second language using the voice of the second user recorded by the second terminal 150. The communication interface 104 of the first terminal 100 may receive the voice of the second user recorded by the second terminal 150 from the second terminal 150. The controller 102 of the first terminal 100 may perform voice recognition using the received voice of the second user. The controller 102 may detect the kind of the second language as a result of the voice recognition.

As another embodiment, the first terminal 100 may identify the kind of the second language using information about language setting set to the second terminal 150. Information about the kind of the language preferred by the second user may be preset to the second terminal 150. The communication interface 104 of the second terminal 150 may transmit the information to the first terminal 100. The communication interface 104 of the first terminal 100 may receive the information from the second terminal 150. The controller 102 may define the kind of the language corresponding to the information as the kind of the second language.

As another embodiment, the first terminal 100 may identify the kind of the second language using information about a region in which the second terminal 150 is located. The second terminal 150 may acquire the information about the region in which the second terminal 150 is located through GPS included in the second terminal 150. The communication interface 104 of the second terminal 150 may transmit the information to the first terminal 100. The communication interface 104 of the first terminal 100 may receive the information from the second terminal 150. The controller 102 of the first terminal 100 may acquire the kind of the language corresponding to the region in which the second terminal 150 is located using the received information.

According to another embodiment, the communication interface 104 of the first terminal 100 may receive the identification information about the kind of the second language from the server 200 or the second terminal 150. The server 200 or the second terminal 150 may identify the kind of the second language using the voice recorded by the second terminal 150, the language setting set to the second terminal, or the information about the region in which the second terminal 150 is located. The server 200 or the second terminal 150 may transmit the identification information about the kind of the second language to the first terminal 100.

In operation S230, when the identified kind of the first language is different from the identified kind of the second language, the second-language greeting transliterated into the first language may be acquired. The controller 102 of the first terminal 100 may compare the identified kind of the first language with the identified kind of the second language. As a result of the comparison, the controller 102 may determine whether the kind of the first language is identical to the kind of the second language.

Figure 7:
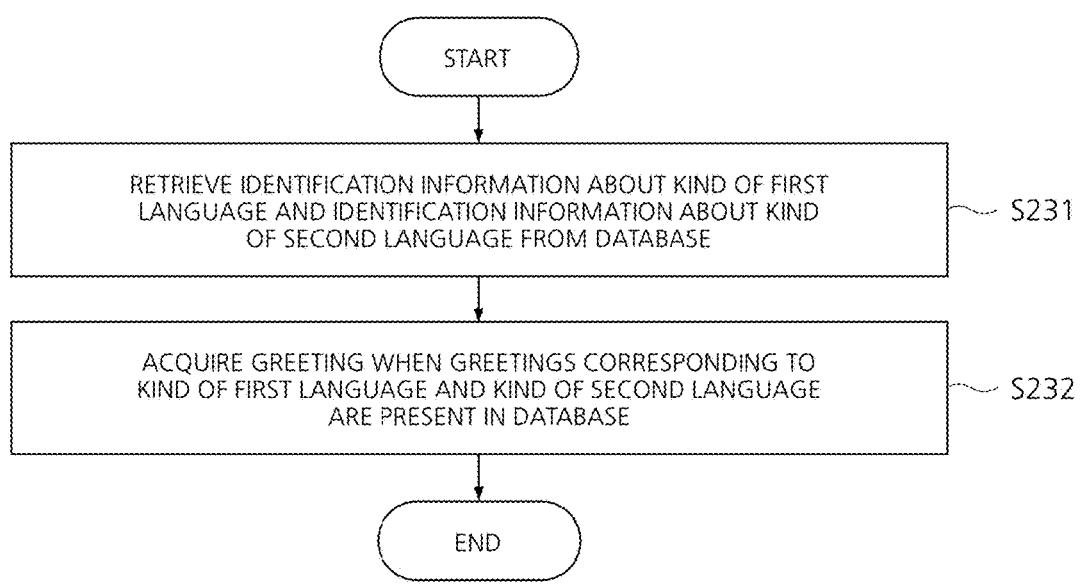
FIG. 7 is a flowchart of a process of acquiring a greeting according to an identified kind of a language by a first terminal, according to an embodiment.

When it is determined that the kind of the first language is different from the kind of the second language, the first terminal 100 may acquire the second-language greeting transliterated into the first language. FIG. 7 is a flowchart of operation S230 of acquiring a greeting according to an identified kind of a language by the first terminal, according to an embodiment.

Referring to FIG. 7, in operation S231, identification information about the kind of the first language and identification information about the kind of the second language may be retrieved from a database. The controller 102 of the first terminal 100 may search for the identification information from the database. The storage 103 of the first terminal 100 may include the database. According to another embodiment, the database may be disposed outside the first terminal 100.

The database may be a relational database in which the identification information about the kind of the first language, the identification information about the kind of the second language, and the second-language greeting transliterated into the first language are stored. Records included in the database may include the identification information about the kind of the first language, the identification information about the kind of the second language, and the greeting corresponding to the identification information.

FIG. 8 is a table showing second-language greetings transliterated into first languages, according to an embodiment. Records included in the database may correspond to items included in the table of FIG. 8. For example, one record included in the database may include "Korean" as the identification information about the kind of the first language, "Spanish" as the identification information about the kind of the second language, and "올리. 무초 구스또 엥 꼬노쎄르떼." as the greeting corresponding to the identification information. As another example, another record may include "English" as the identification information about the kind of the first language, "Korean" as the identification information about the kind of the second language, and "an-nyeong-ha-se-yo. ban-gab-seub-ni-da." as the greeting corresponding to the identification information.

Referring to FIG. 7 again, in operation S232, when the greetings corresponding to the kind of the first language and the kind of the second language are present in the database, the greetings may be acquired from the database as a result of the retrieving. When the greetings are present in the database, the controller 102 of the first terminal 100 may acquire the greetings from the database.

Figure 9:
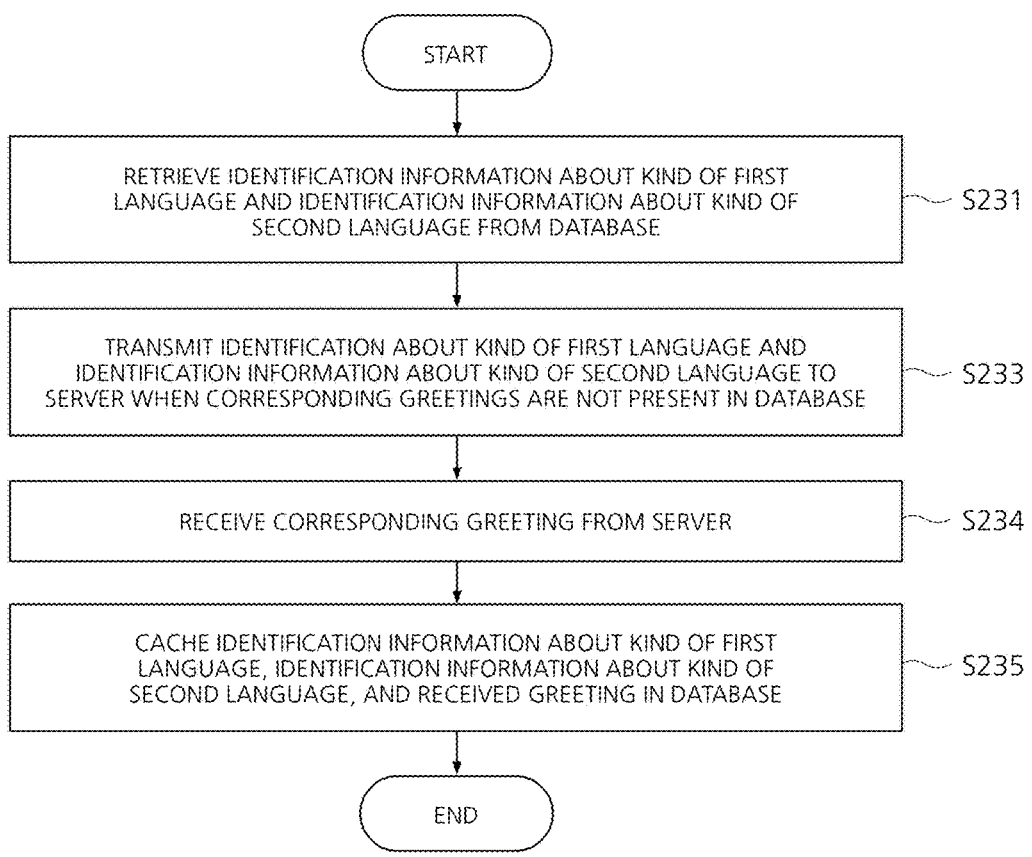
FIG. 9 is a flowchart of a process of acquiring a greeting according to an identified kind of a language by a first terminal, according to another embodiment.

FIG. 9 is a flowchart of operation S230 of acquiring the greeting according to the identified kind of the language by the first terminal 100, according to an embodiment. Referring to FIG. 9, in operation S231, identification information about the kind of the first language and identification information about the kind of the second language may be searched for from a database. The controller 102 of the first terminal 100 may retrieve the identification information from the database.

In operation S232, when the greetings corresponding to the kind of the first language and the kind of the second language are not present in the database, the identification information about the first language and the identification information about the second language may be transmitted to the server 200.

For example, the kind of the first language may be Korean, and the kind of the second language may be Turkish. The greetings corresponding to the kinds of the first language and the second language may not be present in the database. The communication interface 104 of the first terminal 100 may transmit the identification information about the kind of the first language and the identification about the kind of the second language to the server 200.

In operation S234, the greetings corresponding to the kind of the first language and the kind of the second language may be received from the server 200 as a response to the transmission. The server 200 may transmit the second-language greeting transliterated into the first language to the first terminal 100. The first terminal 100 may receive the greeting from the server 200.

In operation S235, the identification information about the kind of the first language, the identification information about the kind of the second language, and the received greetings may be cached in the database. The controller 102 of the first terminal 100 may store the identification information about the kind of the first language, the identification information about the kind of the second language, and the received greetings in the database. The controller 102 of the first terminal 100 may store the identification information about the kind of the first language, the identification information about the kind of the second language, and the received greetings in the database. Accordingly, when the identification information about the kind of the first language and the identification information about the kind of the second language are retrieved from the database next time, the first terminal 100 may be ready to acquire the greeting as a result of the retrieving.

Figure 10:
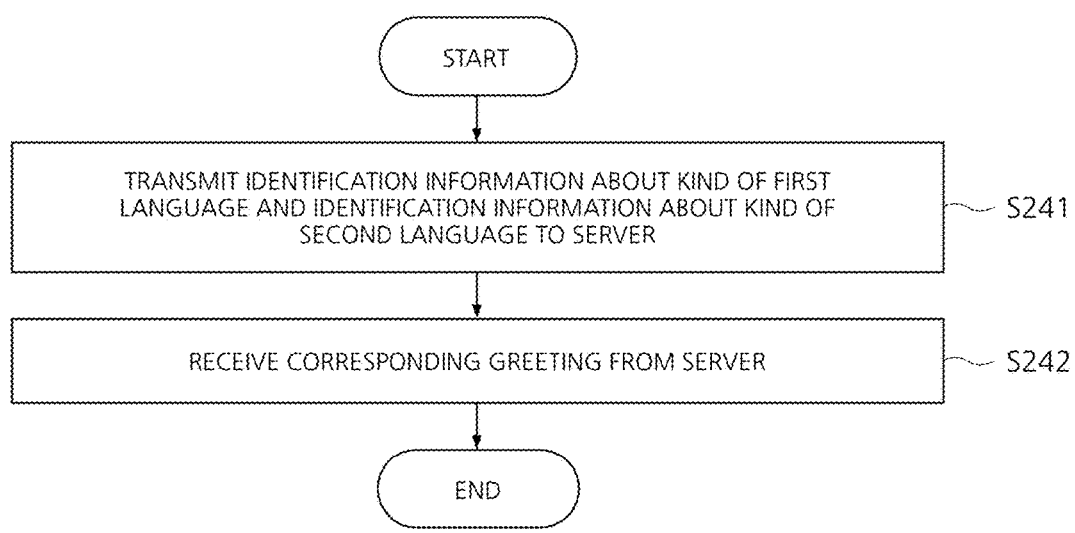
FIG. 10 is a flowchart of a process of acquiring a greeting according to an identified kind of a first language by a first terminal, according to another embodiment.

FIG. 10 is a flowchart of operation S230 of acquiring the greeting according to the identified kind of the language by the first terminal 100, according to an embodiment. Referring to FIG. 10, in operation S241, the identification information about the kind of the first language and the identification information about the kind of the second language may be transmitted to the server 200. The first terminal 100 may directly transmit the identification information about the kind of the first language and the identification information about the kind of the second language, without retrieving the database.

In operation S242, the greetings corresponding to the kind of the first language and the kind of the second language may be received from the server 200 as a response to the transmission. The server 200 may transmit the second-language greeting transliterated into the first language to the first terminal 100. The first terminal 100 may receive the greeting from the server 200.

Figure 11:
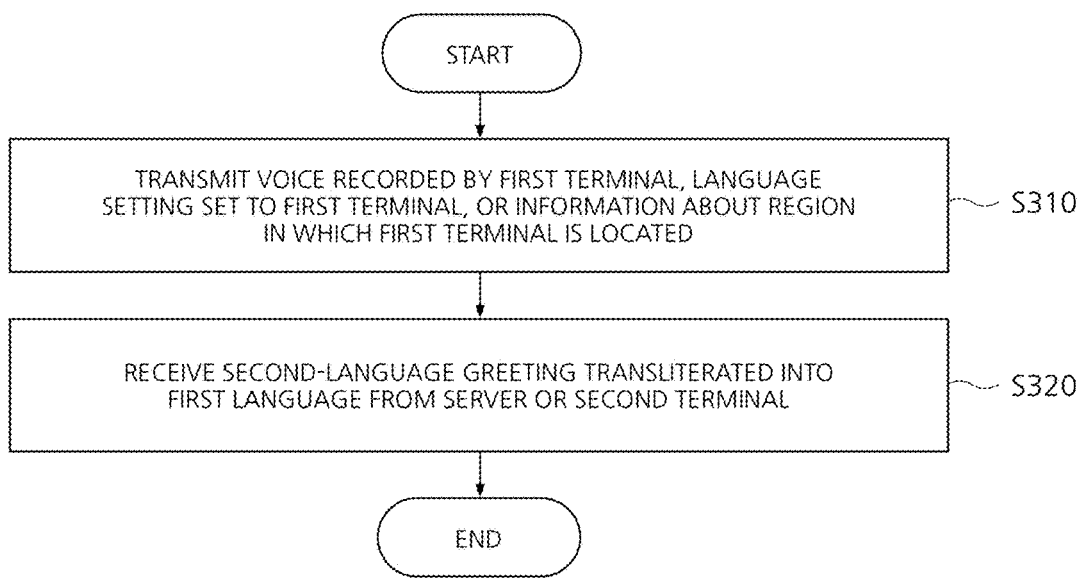
FIG. 11 is a flowchart of a process of acquiring a greeting by a first terminal, according to another embodiment.

FIG. 11 is a flowchart of operation S200 of acquiring the greeting by the first terminal 100, according to another embodiment. Referring to FIG. 11, in operation S310, the voice of the first user recorded by the first terminal 100, the language setting set to the first terminal 100, or the information about the region in which the first terminal 100 is located may be transmitted to the server 200 or the second terminal 150. The communication interface 104 of the first terminal 100 may transmit the recorded voice, the language setting, or the information about the region to the server 200 or the second terminal 150.

In operation S320, the second-language greeting transliterated into the first language may be received from the server 200 or the second terminal 150 as a response to the transmission. The server 200 or the second terminal 150 may identify the kind of the first language using the recorded voice, the language setting, or the information about the region, which is received from the first terminal 100. Also, the server 200 or the second terminal 150 may identify the kind of the second language using the voice of the second user recorded by the second terminal 150, the language setting set to the second terminal, or the information about the region in which the second terminal 150 is located.

The server 200 or the second terminal 150 may acquire the second-language greeting transliterated into the first language using the identified kind of the first language and the identified kind of the second language. The server 200 or the second terminal 150 may transmit the acquired greeting to the first terminal 100. The communication interface 104 of the first terminal 100 may receive the greeting.

Referring to FIG. 3 again, in operation S400, the acquired greeting may be displayed. The output interface 105 of the first terminal 100 may display the acquired greeting.

Figure 12:
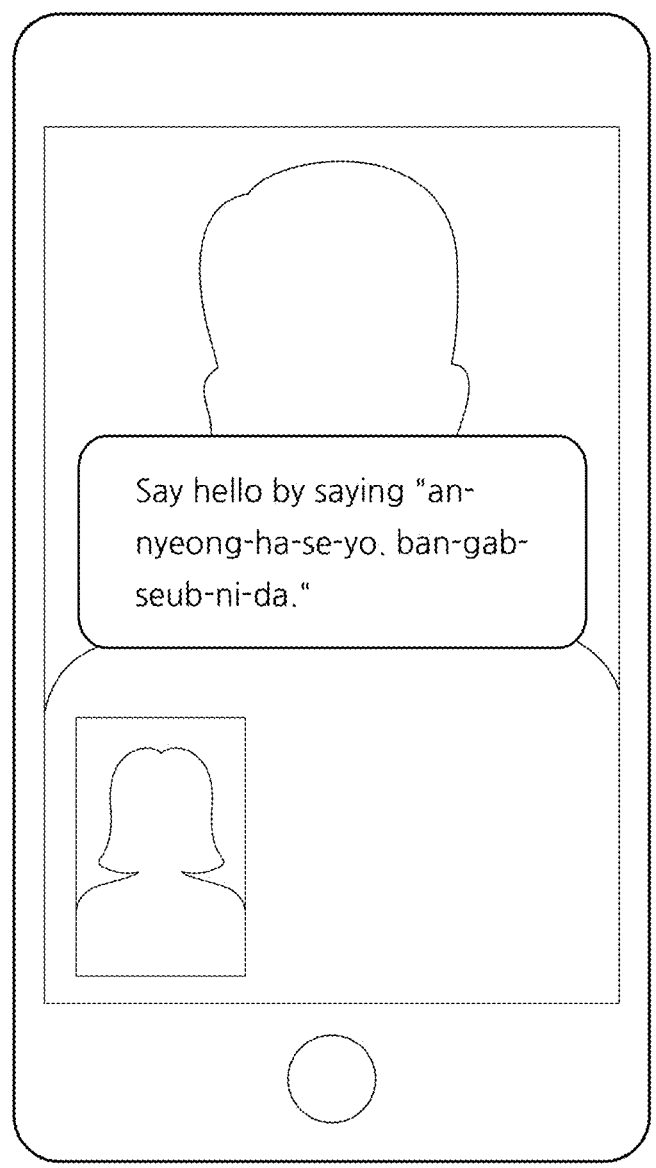
FIG. 12 is a front view of a first terminal that displays a second-language greeting transliterated into a first language, according to an embodiment.

FIG. 12 is a front view of the first terminal 100 that displays the second-language greeting transliterated into the first language, according to an embodiment. For example, it is assumed that the kind of the first language is English, and the kind of the second language is Korean. The greeting acquired by the first terminal 100 may be, for example, "an-nyeong-ha-se-yo. ban-gab-seub-ni-da." As illustrated in FIG. 12, the output interface 105 of the first terminal 100 may display the acquired greeting.

The first user may be guided to read aloud the greeting displayed on the first terminal 100. In other words, the first terminal 100 may help the first user who speaks the first language to easily say the second-language greeting. Therefore, the users who speak different languages may more smoothly make video calls with each other. Also, it is possible to reduce awkwardness between the users who speak different languages when making video calls with each other. Also, it is possible to induce conversation between the users who speak different languages when making video calls with each other.

Figure 13:
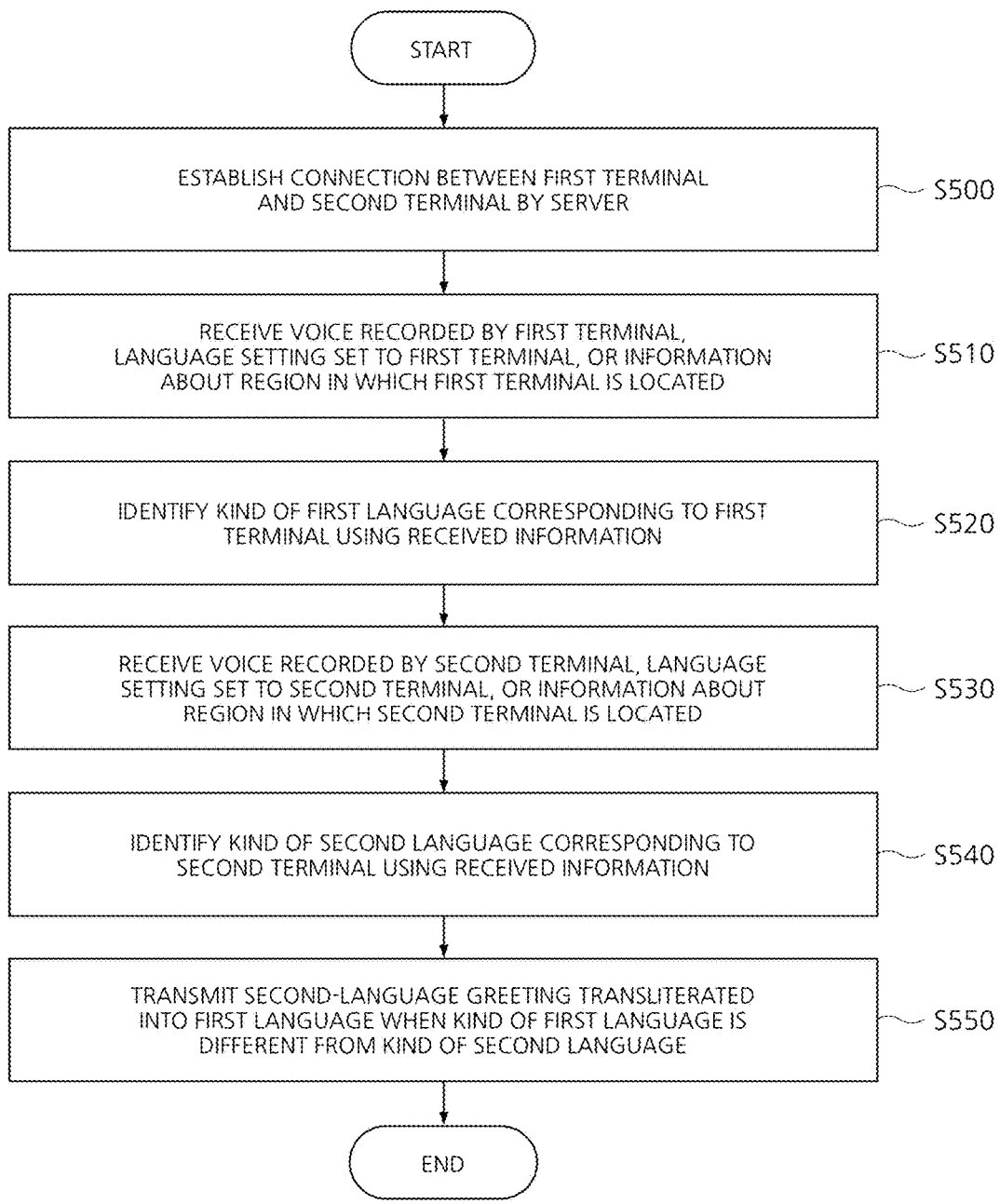
FIG. 13 is a flowchart of a terminal control method according to another embodiment.

FIG. 13 is a flowchart of a terminal control method according to another embodiment. Referring to FIG. 13, in operation S500, the server 200 may establish connection between the first terminal 100 and the second terminal 150.

In operation S510, the server 200 may receive a first voice recorded by the first terminal 100, a first language setting set to the first terminal 100, or first information about a region in which the first terminal 100 is located. In operation S520, the server 200 may the kind of the first language corresponding to the first terminal 100 using the first voice, the first language setting, or the first information.

In operation S530, the server 200 may receive a second voice recorded by the second terminal 150, a second language setting set to the second terminal 150, or second information about a region in which the second terminal 150 is located. In operation S540, the server 200 may the kind of the second language corresponding to the second terminal 150 using the second voice, the second language setting, or the second information.

In operation S550, when the identified kind of the first language is different from the identified kind of the second language, the server may transmit a second-language greeting transliterated into the first language to the first terminal 100. The communication interface 104 of the first terminal 100 may receive the greeting from the server 200. The output interface 105 of the first terminal 100 may display the received greeting.

Also, the server 200 may transmit a first-language greeting transliterated into the second language to the second terminal 150. The communication interface 104 of the second terminal 150 may receive the greeting from the server 200. The output interface 105 of the second terminal 150 may display the received greeting.

According to one or more embodiments, the users who speak different languages may more smoothly make video calls with each other. Also, it is possible to reduce awkwardness between the users who speak different languages when making video calls with each other. Also, it is possible to induce conversation between the users who speak different languages when making video calls with each other.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Embodiments may be embodied in a non-transitory computer-readable recording medium having recorded thereon computer-executable instruction codes, such as a program module executable by the computer. The non-transitory computer-readable recording medium may be any available medium which can be accessed by the computer and may include any volatile and non-volatile media and any removable and non-removable media.

Furthermore, the non-transitory computer-readable recording medium may include any computer storage medium and communication medium. The computer storage medium may include any volatile and non-volatile media or any removable and non-removable media embodied by a certain method or technology for storing information such as computer-readable instruction codes, a data structure, a program module, or other data. The communication medium may include computer-readable instruction code, a data structure, a program module, other data of modulated data signals, or other transmission mechanisms, and may include any information transmission medium.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of a video call between a first user and a second user, the method comprising:
   initiating the video call between a first terminal associated with the first user and a second terminal associated with the second user;
   determining languages of the first user and the second user who participate in the video call;
   in case the first user's language is a first language and the second user's language is a second language different from the first language, referring to a greeting conversion table and retrieving a transliteration of a greeting of the second language in the first language;
   displaying, on the first terminal, a first set of characters of the first language representing the retrieved transliteration and a second set of characters of the first language representing an instruction to vocally read the transliteration; and
   transmitting, to the second terminal, a video stream featuring the first user such that, if the first user vocally reads the transliteration following the instruction, the video stream features the first user's greeting to the second user in the second language.

2. The method of claim 1, wherein the first terminal determines that the first user speaks the first language by processing a voice of the first user received by the first terminal.

3. The method of claim 1, wherein the first terminal determines that the first user speaks the first language based on a language setting of the first terminal.

4. The method of claim 1, wherein the first terminal determines that the first user speaks the first language based on a location of the first terminal.

5. The method of claim 1, further comprising:
   transmitting, by the first terminal to at least one server, data selected from the group consisting of a voice of the first user recorded by the first terminal, a language setting set to the first terminal, and information about a region in which the first terminal is located; and
   receiving, by the first terminal, information indicating that the first user's language is the first language from the at least one server.

6. The terminal control method of claim 1, further comprising:
- transmitting, by the first terminal to the second terminal, data selected from the group consisting of a voice of the first user recorded by the first terminal, a language setting set to the first terminal, and information about a region in which the first terminal is located; and
- receiving, by the first terminal, information indicating that the first user's language is the first language from the second terminal.

7. The terminal control method of claim 1, further comprising:
- receiving, by the first terminal, a voice of the second user recorded by the second terminal;
- processing, by the first terminal, the voice to identify the second user's language; and
- transmitting, by the first terminal, to the second terminal, information indicating that the second user's language is the second language.

8. The method of claim 1, further comprising:
- in case the first user's language is the first language and the second user's language is the second language different from the first language, displaying, on the second terminal, characters of the second language that comprise a transliteration, in the second language, of a greeting of the first language along with the video stream from the first terminal.

9. The method of claim 1, wherein the greeting conversion table is stored in the first terminal or a server, wherein the greeting conversion table comprises transliterations of the greeting of the second language in a plurality of languages including the first language.

10. A non-transitory computer-readable recording medium having recorded thereon a program for executing the method of claim 1.

11. A terminal comprising:
- at least one processor; and
- at least one memory storing computer-executable instructions configured to cause the terminal to perform the method of claim 1 when executed by the at least one processor.

12. A method of a video call between a first user and a second user, the method comprising:
- coordinating, by at least one server, to establish the video call between a first terminal associated with the first user and a second terminal associated with the second user;
- determining languages of the first user and the second user who participate in the video call;
- in case the first user's language is a first language and the second user's language is a second language different from the first language, referring to a greeting conversion table and retrieving a transliteration of a greeting of the second language in the first language;
- causing, by the at least one server, the first terminal to display a first set of characters of the first language representing the retrieved transliteration and a second set of characters of the first language representing an instruction to vocally read the transliteration; and
- causing to transmit, to the second terminal, a video stream featuring the first user such that, if the first user vocally reads the transliteration following the instruction, the video stream features the first user's greeting to the second user in the second language.

13. The method of claim 12, further comprising:
- in case the first user's language is the first language and the second user's language is the second language different from the first language, causing, by the at least one server, the second terminal to display characters of the second language that comprise a transliteration, in the second language, of a greeting of the first language along with the second video stream from the first terminal.

14. The method of claim 12, further comprising:
- receiving, by the at least one server, from the first terminal, data selected from the group consisting of a voice of the first user recorded by the first terminal, a language setting of the first terminal, and information about a region where the first terminal is located; and
- transmitting, by the at least one server, to the first terminal, information indicating that the first user's language is the first language from the at least one server.

* * * * *